(No Model.)
S. B. WILLIAMS.
PLOW ATTACHMENT.
No. 322,769. Patented July 21, 1885.
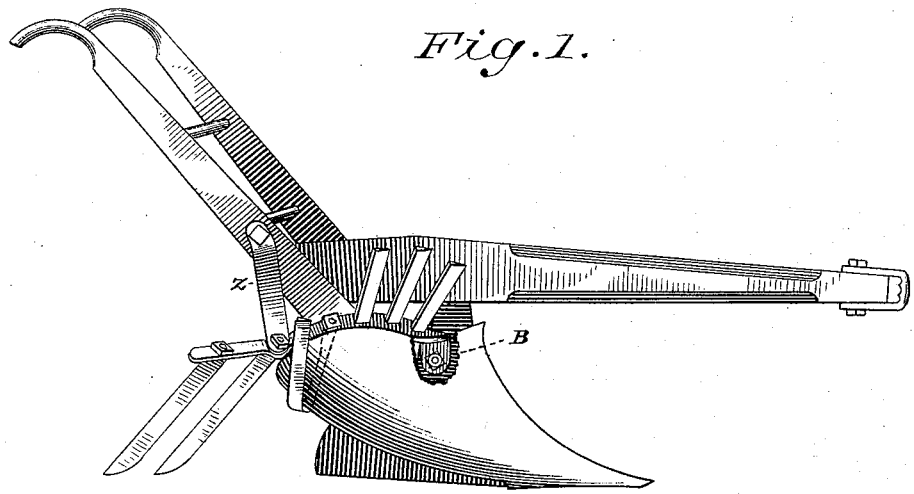
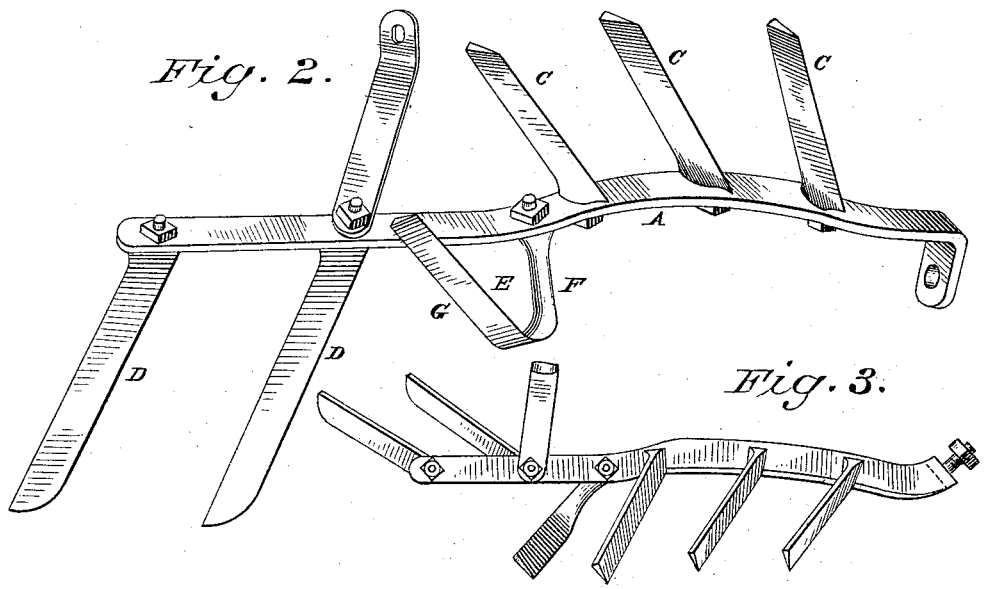
WITNESSES
INVENTOR
Samuel B. Williams
By his Attorneys Anderson & Smith

UNITED STATES PATENT OFFICE.

SAMUEL B. WILLIAMS, OF SAILOR'S REST, TENNESSEE.

PLOW ATTACHMENT.

SPECIFICATION forming part of Letters Patent No. 322,769, dated July 21, 1885.

Application filed April 27, 1885. (No model.)

*To all whom it may concern:*

Be it known that I, S. B. WILLIAMS, a citizen of the United States, residing at Sailor's Rest, in the county of Montgomery and State of Tennessee, have invented certain new and useful Improvements in Plow Attachments; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of my invention as applied to a plow. Figs. 2 and 3 represent the attachment detached from the plow.

This invention has relation to clod cutting and pulverizing attachments for plows.

In the accompanying drawings, the letter A designates the main bar of the attachment, which is designed to be secured to the plow-plate or plow-standard. In the construction illustrated the end of the bar A is bent and provided with a perforation for the passage of a fastening-bolt, B. Z is a short brace extending from the main bar A to the plow-handle.

C C represent oblique knives which project outward, upward, and forward from the inner portion of the bar A, which is located behind the upper edge of the mold-board. The angular inclination of the planes of these knives is downward and inward obliquely, so that they will receive the furrow slice or soil as it is carried up over the mold-board full on their cutting-edges, and will be secured on both sides.

D D represent oblique trailing-knives, which are secured to the outer portion of the bar A, having a direction downward and rearward and having their planes parallel to the direction of the furrow or nearly so. As indicated in the drawings, these knives are set a little wider apart at their lower ends than they are at their upper or attached portions.

E represents the main cutting-knife, which is of angular formation, its shank portion F extending from its attachment to the bar A downward behind the upper outer corner of the mold-board wing. The blade portion G of this knife extends upward, forward, and outward from the lower part of the shank, so that it is at the side of the upper portion of the mold-board in position to receive the main body of the furrow slice or mass of soil brought up by the plow upon its cutting-edge. The plane of this knife is inward and downward, so that it receives the soil true upon the cutting-edge, and is secured on both sides.

This angular knife E may be employed with or without the oblique knives hereinbefore referred to, which extend directly from the bar A; but the addition of the latter knives or of some of them is preferred.

Having described this invention, what I claim, and desire to secure by Letters Patent, is—

1. A clod-cutting plow attachment having an angular knife formed with a shank extending from the main bar of said attachment designed to pass behind the corner of the mold-board, and a cutting-blade extending from the lower end of said shank upward and outward, the plane of the blade being downward and inward, substantially as specified.

2. In a plow attachment, the combination, with an angular knife having a shank extending downward below the corner of the mold-board, and a blade extending upward and outward from the lower end of said shank, of oblique cutting-knives extending directly from the main bar, substantially as specified.

In testimony whereof I affix my signature in presence of two witnesses.

SAMUEL B. WILLIAMS.

Witnesses:
ED. T. LUCAS,
WM. A. SHELBY.